United States Patent [19]

Ohkoshi et al.

[11] 4,269,285
[45] May 26, 1981

[54] LIFTING APPARATUS FOR ELECTRICAL SWITCHBOARDS

[75] Inventors: Isao Ohkoshi, Tama; Hideki Ikeuchi, Fuchu, both of Japan

[73] Assignee: Tokyo Shibaura Denki Kabushiki Kaisha, Kawasaki, Japan

[21] Appl. No.: 959,060

[22] Filed: Nov. 9, 1978

[30] Foreign Application Priority Data

Nov. 9, 1977 [JP] Japan .................. 52-133568

[51] Int. Cl.³ .................................. B66B 9/20
[52] U.S. Cl. ........................... 187/9 R; 414/608
[58] Field of Search .......... 187/9 R, 10, 11, 95, 187/19; 414/608, 284, 464, 498, 494, 500, 446, 279, 280, 284; 182/103, 145

[56] References Cited

U.S. PATENT DOCUMENTS

| | | | |
|---|---|---|---|
| 976,240 | 11/1910 | Winkler | 182/103 |
| 1,280,090 | 9/1918 | Schrottky | 187/9 R |
| 1,297,619 | 3/1919 | Wessmann | 187/9 R |
| 2,175,041 | 10/1939 | Thumim | 187/11 |
| 2,714,434 | 8/1955 | Peterson | 187/11 |
| 2,792,913 | 5/1957 | Capgras | 187/9 R |
| 3,012,635 | 12/1961 | Blain | 187/19 |
| 3,081,839 | 3/1963 | O'Brien | 182/103 |
| 3,115,211 | 12/1963 | Ostrander, Jr. | 187/11 |
| 3,804,208 | 4/1974 | Iida | 187/19 |
| 3,866,717 | 2/1975 | Johansson | 187/19 |
| 3,964,573 | 6/1976 | Wilson | 187/11 |

*Primary Examiner*—Robert J. Spar
*Assistant Examiner*—Kenneth Noland
*Attorney, Agent, or Firm*—Oblon, Fisher, Spivak, McClelland & Maier

[57] ABSTRACT

A lifting mechanism including a carriage mounting a circuit breaker, a disconnecting switch and the like and supported on guide rails to facilitate racking movement of the circuit breaker, disconnecting switch and the like between the positions of electrical engagement and disengagement. The carriage includes a bucket upon which is mounted electrical devices, e.g. a circuit breaker, a disconnecting switch and rollers to transfer a bucket which moves along the guide rails which are detachably engaged in an electrical switchboard.

6 Claims, 11 Drawing Figures

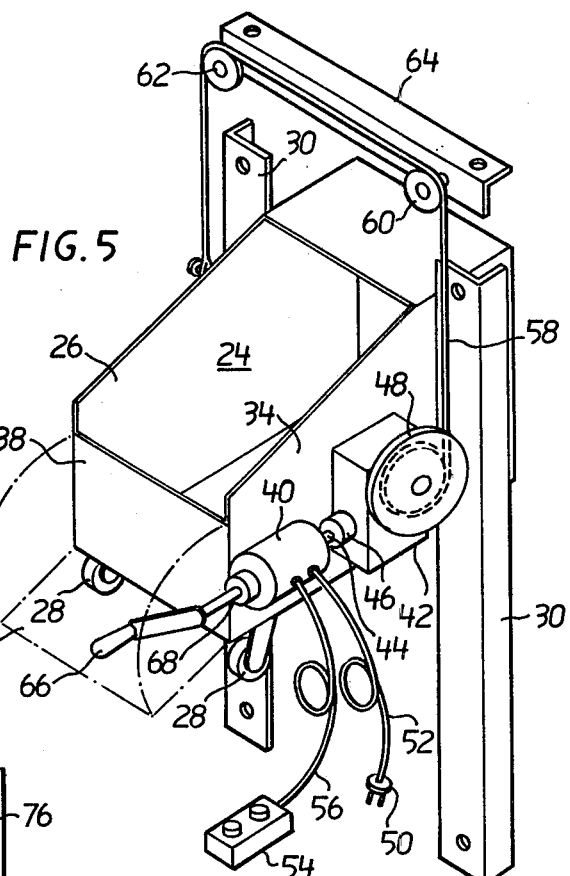
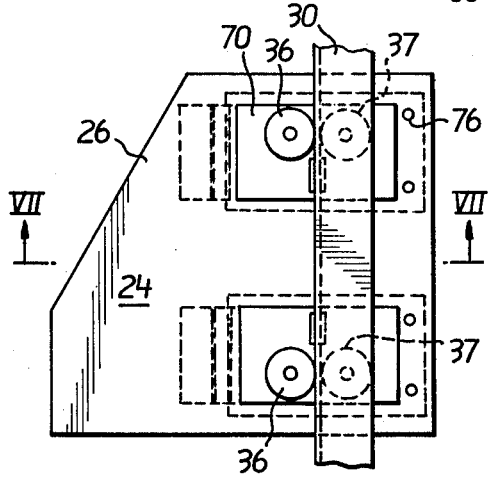
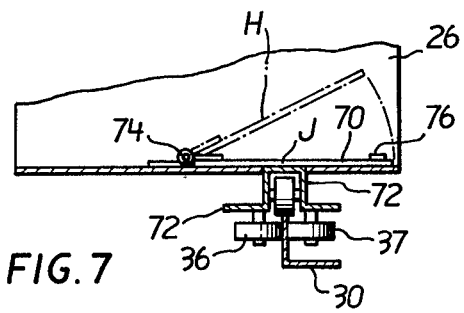

LIFTING APPARATUS FOR ELECTRICAL SWITCHBOARDS

BACKGROUND OF THE INVENTION

This invention relates to a multiple-stage type electrical switchboard, and more particularly to an improved lifting apparatus which lifts up electrical devices such as circuit breakers and draws them into the multiple-stage electrical switchboard and draws them out.

Generally, as shown in FIGS. 1 and 2, a multiple-stage electrical switchboard 10 which contains a plurality of compartments for electrical devices, a lifting apparatus frame 12 which consists of a bucket 14 mounting electrical devices 16, driving gear 18 and trucks 20 is used to facilitate racking movement of electrical devices 16 between positions of electrical engagement and disengagement.

But in this case, not only does the weight and bulk of the lifting apparatus frame 12 become difficult for an electrician to handle, but such is expensive because the lifting apparatus frame 12 contains guide rails 22 which are also used for supporting the bucket 14. It is also necessary to provide the lifting apparatus frame 12 with an area for moving, that is, a passage space for inspection corresponding to the width A and the relatively large accommodating space corresponding to the area BXC as shown in FIG. 2 in front of the electrical switchboard 10.

Furthermore, such lifting apparatus frame 12 is in danger of being turned upside down during jolting on the rough floor such as when an electrician may carelessly move the lifting apparatus frame 12 with the bucket 14 mounting electrical devices on the top of the lifting apparatus frame 12.

SUMMARY OF THE INVENTION

It is a general object of the present invention to provide an improved lifting apparatus capable of easily racking electrical devices in an electrical switchboard.

An additional object of the present invention is to provide a lifting apparatus of the above-noted character, which reduces the necessary areas for moving and accommodating such lifting apparatus with respect to the electrical switchboard.

A further object of the invention is to provide a lifting apparatus of the above-noted character, with a reduced weight and bulk.

Still another object of the present invention is to provide a lifting apparatus of the above-noted character capable of reducing the probability of being turned upside down when moving.

Yet another object of the present invention is to provide a lifting apparatus of the above-noted character, which is inexpensive to manufacture, efficient in design and reliable in operation.

Other objects of the invention will in part be obvious and in part appear hereinafter.

In accordance with the present invention, there is provided a lifting apparatus for racking relatively large heavy electrical devices into and out of an electrical switchboard. The lifting apparatus of the invention includes a carriage on which the electrical device, for example, a large circuit breaker, is mounted. The carriage, in turn, is supported on opposed guide rails mounted to the enclosure, which may be in the form of an electrical switchboard or the like. The rails accommodate facile movement of the carriage from a ground position to the engaged position.

From the disengaged or ground position, racking movement to an engaged position is effected via a wire rope which is pulled by a racking screw or via a rack and pinion combination. The racking screw and rack and pinion combination are actuated by an electrical motor or manual handle.

Guide rails are detachably mounted to an electrical switchboard to prevent the carriage mounted electrical devices from turning upside down by inadvertent movement. When the electrical devices are in an engaged position, the lifting apparatus will be disengaged from the guide rails, and the guide rails, in turn, will be disengaged from the electrical switchboard if necessary.

The invention accordingly comprises the features of construction, combination of elements, and arrangement of parts which will be exemplified in the construction hereinafter set forth, and the scope of the invention will be indicated in the corresponding claims.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 5 is an enlarged perspective view of the lifting apparatus embodying the present invention;

FIG. 6 is a side view of a portion of FIG. 5, illustrating the bucket, the rollers which are attached to the bucket and the guide rails along which the rollers move;

FIG. 7 is a sectional view taken substantially along the lines VII—VII of FIG. 6, as seen in the direction of the arrows;

DETAILED DESCRIPTION OF THE PREFERRED EMBODIMENTS

Figure 1:
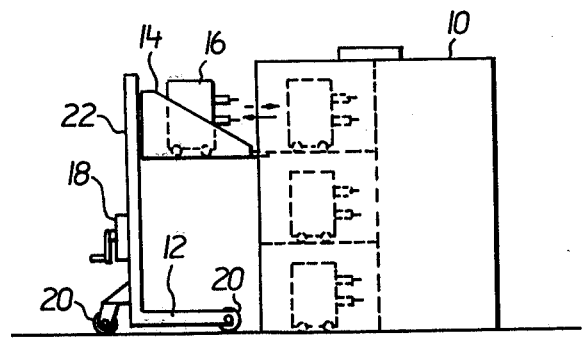
FIG. 1 is a side view of a conventional lifting apparatus frame mounting a circuit breaker.
Figure 2:
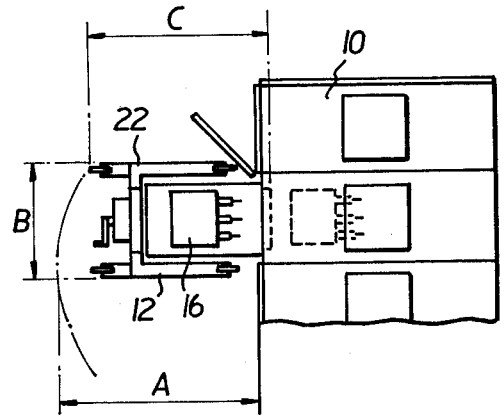
FIG. 2 is a plan view of the lifting apparatus frame of FIG. 1.
Figure 3:
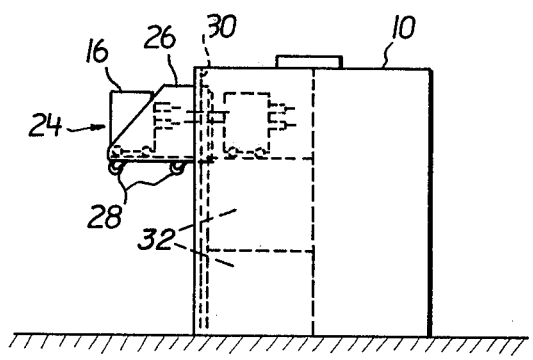
FIG. 3 is a side view of the lifting apparatus mounting a circuit breaker embodying the present invention.
Figure 4:
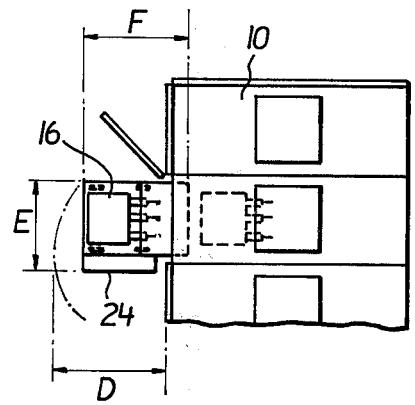
FIG. 4 is a plan view of the lifting apparatus of FIG. 3.

Referring now to the drawings and more particularly to FIGS. 3 and 4 thereof, the present invention is embodied in a lifting mechanism for facilitating racking movement of the electrical device 16, e.g. a large circuit breaker movable into or out of a cubicle or compartment of an electrical switchboard 10. The circuit breaker 16 is mounted on a carriage 24, which contains a bucket 26 and wheels 28, which in turn are supported for racking movement by opposed guide rails, indicated by reference numeral 30, and moves up and down along guide rails 30.

The guide rails 30 are mounted to box frame 32 which is contained in the electrical switchboard 10. The carriage 24 is smaller, lighter and less expensive than the conventional lifting apparatus frame 12 because the carriage 24 does not contain the guide rails 30 in itself. Further, the lifting mechanism according to an embodiment of this invention reduces the area of movement, that is, the passage space for inspection corresponding to length D and the accommodating space for the carriage 24 corresponding to the area EXF as shown in FIG. 4 in front of the electrical switchboard 10. Furthermore, the center of gravity of the carriage 24 mounting electrical device 16 is so low that the carriage 24 is not in danger of being turned upside down as a result of jolting on the rough floor. Because the carriage 24 mounting the electrical device 16 is carried on the rough floor via wheels 28 which are attached to the carriage 24, the required strength of the guide rails 22 can be reduced because the guide rails 22 share the weight of carriage 24 mounting the electrical device 16 with the box frame 32 to which the guide rails 22 are attached.

Referring now to FIGS. 5 and 6, the detailed construction of the carriage 24 is shown therein. The carriage 24 consists of a bucket 26 mounting an electrical device 16 (not shown in FIG. 5) and a driving device 34 and wheels 28. Vertically elongated guide rails 30 are affixed to the box frame 32 (not shown in FIG. 5) for the purpose of supporting the carriage 24 via rollers 36 which are attached to the bucket 26, as will be discussed more fully hereinafter.

A mounting plate 38, hinged to the end of the bucket 26, constitutes not only the end side of the bucket 26, but also the sloped guide plate for mounting the electrical device 16. In order to mount the electrical device 16 into the bucket 26 located on the ground, when the mounting plate 38 is lowered (as indicated by G) to form a sloped guide plate 38, the electrical device 16 can be disposed in the bucket 26 by sliding the electrical device 16 on the sloped guide plate 38, via wheels if necessary, by application of a slight force which makes the electrical device 16 climb over the sloped guide plate 38, without lifting up the electrical device 16.

The wheels 28 affixed to the base of the bucket 26 are casters which enable the carriage 24 to move between electrical switchboards, or from the electrical equipment to the another electrical switchboard, in order to rack the electrical device 16 to the electrical switchboard 10. It is desirable that the number of the wheels 28 is greater than two. All of the wheels 28 are not necessarily caster wheels which can change course. When the wheels 28 are affixed to the side plates of the bucket 26 to reduce the height of the base of the bucket 26 from the floor, the electrical device 16 can easily be disposed in the bucket 26 by making the electrical device 12 climb over the more moderate sloped guide plate 38.

Driving device 34, which drives the carriage 24, consists of a motor 40 and a reduction gear 42 which is connected to a power shaft 44 of motor 40 via a coupling 46 and a drum 48 which is rotatably affixed to the side of the reduction gear 42. The motor 40 is affixed to the side of the bucket 26, is reversably rotatable and can contain a reduction mechanism and controlling mechanism, if necessary. On the other hand, reduction gear 42 is affixed to the side of the bucket 26 and is provided with the self-rocking mechanism which contains a worm wheel. Besides, when the motor 40 contains the controlling mechanism, reduction gear 42 is not necessarily provided with the self-locking mechanism. Furthermore, the output revolution of motor 40 is equal to the predetermined revolution of the drum 48, the drum 48 being directly connected with the power shaft 44 of motor 40 and not via the reduction gear 42. A plug 50 is connected with the motor 40 via a power cable 52. A power switch 54 is connected with the motor 40 via a control cable 56. The drum 48 contains a roller with a peripheral groove or with flange on the opposite end of the roller to wind up a wire rope 58 around the roller, described more fully hereafter.

One of the ends of the wire rope 58 is connected with the drum 48 and the other end of the wire rope 58 is connected with the bucket 26 via pulleys 60, 62 which are rotatably affixed to the side far 64 which is contained in the box frame 32. The pulleys 60, 62 may be affixed to the upper part of the guide rails 30 instead of the side far 64, if necessary. One or both of the ends of wire rope 58 are detachably connected with the bucket 26 or the drum 48 respectively. Therefore, we can raise, lower or stop the carriage 24 by winding or unwinding the wire rope 58 via the motor 40.

Crank arm 66 is detachably affixed to the motor 40 via a coupling 68 in order to achieve the movement of the carriage 24 when electrical supply is not equipped.

Guide rails 30 are vertically elongated along the box frame 32 and may well be either detachably affixed to the box frame 32 or consist of the box frame 32. Furthermore, the cross-sectional shape of the guide rail 30 is not necessarily L-shaped.

FIG. 6 is the side view of the carriage 24 and shows only the connecting mechanism between carriage 24 and guide rails 30. Therefore, no other device except the connecting mechanism are shown in FIG. 6. Rollers 36 and 37 are rotatably connected to the supporting boards 70 via L-shaped plate 72. Furthermore, the supporting boards 70 are connected to the bucket 26 via hinges 74. Normally the supporting boards 70 are connected to the both sides of the bucket 26, but some of the supporting boards which are connected to the one side of the bucket 26 may be fixed to the bucket 26.

Referring to FIG. 7, when the electrician engages the rollers 36 and 37 with guide rails 30, the supporting boards 70 are inwardly pivoted on the hinge 74 to the position indicated at H in the bucket 26, and the carriage 24 is then inserted between the guide rails 30, and the supporting boards 70 are pushed outwardly to the position indicated at J (FIG. 7) and fixed to the sideplate of the bucket 26 by locks 76 which are fixed to the supporting boards 70. Thus, mechanically controlled ascending or descending movement of the carriage 24 along the guide rails 30 by means of the connecting mechanism between the rollers 36, 37 and the guide rails 30 is provided.

Regarding accommodation of electrical devices 16 into the compartment of the electrical switchboard 10, the electrician mounts the electrical device 16 on the carriage 24 by means of sliding it along the sloped mounting plate 38 (as shown by G). He then inserts the carriage 24 with the supporting board 70 turned inwardly between guide rails 30, and turns the supporting board 70 outwardly to engage the rollers 36,37 with the guide rails 30. He can raise carriage 24 upon which the electrical device 16 is mounted along the guide rails 30 and stop the carriage 24 at the predetermined height that corresponds to the vacant compartment of the electrical switchboard 10 to thus position the electrical device 16 within the compartment of the electrical switchboard 10.

In turn, regarding movement of electrical device 16 out of the compartment of the electrical switchboard 10, the electrician handles the lifting apparatus in the inverse manner stated above.

Figure 8:
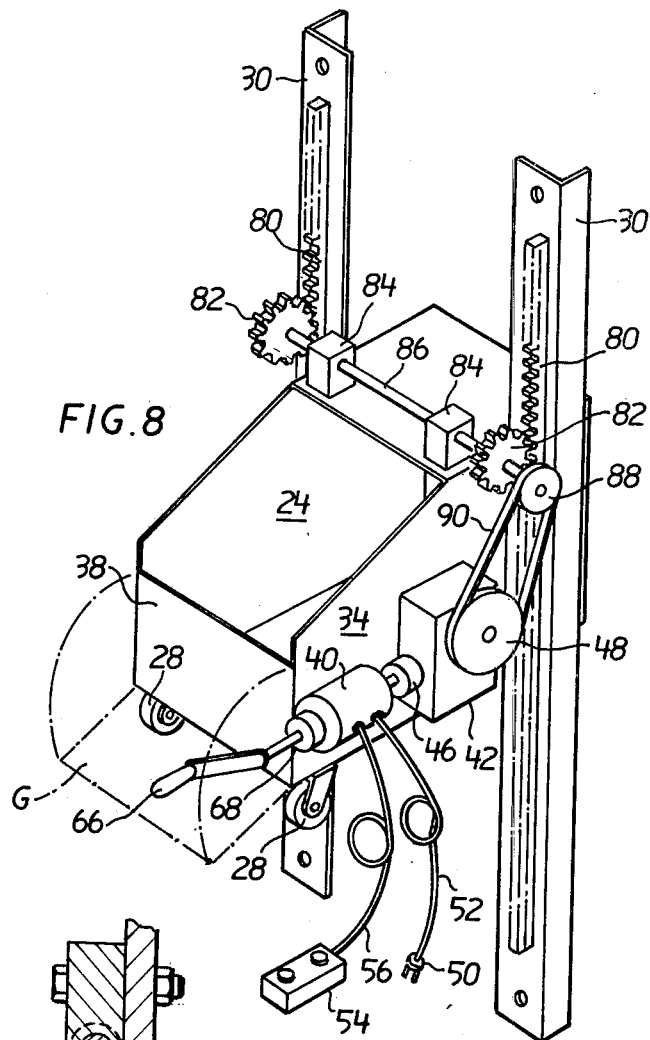
FIG. 8 illustrates a modification of the apparatus.
Figure 9:
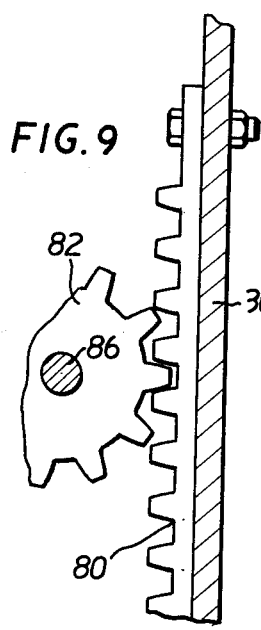
FIG. 9 illustrates a portion of the modified apparatus illustrated in FIG. 8.

FIGS. 8 and 9 set forth another embodiment of this invention. Racks 80 are attached to the guide rails 30, and pinions 82 are supported by bearings 84 via a shaft 86. The pulley 88 is attached to the end of the shaft 86, and connected with the drum 48 via a belt 90. The pinions 82 are driven by the pulley 88 via belt 90 which is driven by the drum 48. The pinions 82 are engaged with the racks 80. Thus the pinion and rack combination substitutes for the wire rope 58 and rollers 60 and 62 (in FIG. 5).

Figure 10:
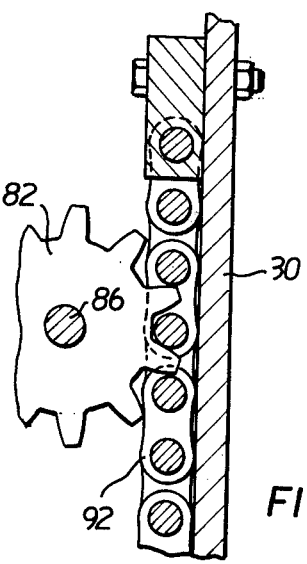
FIG. 10 illustrates a portion of the further modification of the apparatus.

FIG. 10 is the modification of the aforementioned embodiment. Chain assembly 92 is attached to the guide rails 30 instead of the racks 80. The pinion 82 is engaged with chain assembly 92.

Figure 11:
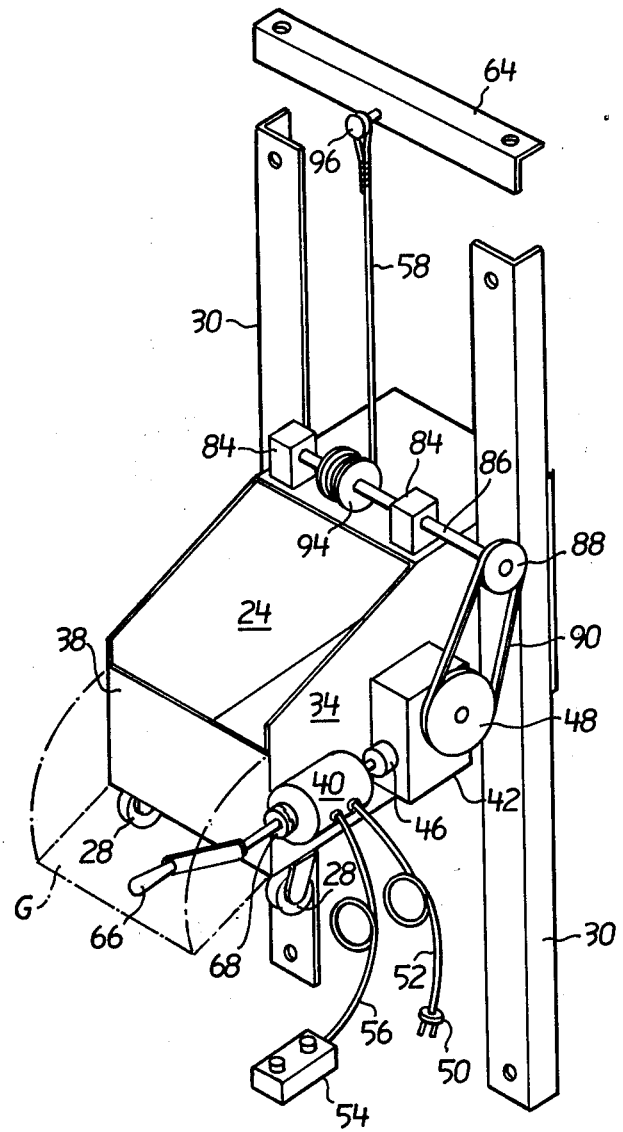
FIG. 11 illustrates still another modification of the apparatus.

FIG. 11 is still another embodiment of this invention. A drum 94 is supported by bearing 84 via a shaft 86. One of the ends of the wire rope 58 is connected with a drum 94 and the other end of the wire rope 58 is connected with the side bar 64 via a pin 96. The drum 94 consists of same structure as the drum 48 aforementioned.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A lifting apparatus for racking an electrical device into and out of a compartment in an electrical switchboard, wherein said lifting apparatus comprises in combination:
    a carriage upon which said electrical device is mounted;
    a plurality of rollers operatively associated with said carriage;
    guide rails directly mounted on the electrical switchboard and supporting said carriage for movement relative to the electrical switchboard such that said rollers move along said guide rails:
    means for pivotably mounting at least one pair of said plurality of rollers on each side of said carriage for cooperation with said guide rails so that the carriage may be readily removed from said guide rails to traverse across a floor surface;
    means for moving said carriage connected to said carriage including
    chains mounted on said guide rails; and
    pinion means connected to said carriage and engaged with said chains.

2. The lifting apparatus defined in claim 1, wherein said moving means further comprises:
    a motor mounted on said carriage; and,
    a reduction gear mounted on said carriage interconnecting said pinion means and said motor.

3. A lifting apparatus for racking an electrical device into and out of a compartment in an electrical switchboard, wherein and lifting apparatus comprises in combination:
    a carriage upon which said electrical device is mounted;
    a plurality of rollers operatively associated with said carriage;
    guide rails directly mounted on the electrical switchboard and supporting said carriage for movement relative to the electrical device such that said rollers move along said guide rails;
    means for moving said carriage connected to said carriage including
    chains mounted on said guide rails;
    pinion means connected to said carriage and engaged with said chains; and
    a plurality of supporting boards which are inwardly pivotably mounted to said carriage wherein said rollers are mounted on said supporting board.

4. A lifting apparatus for racking an electrical device into and out of a compartment in an electrical switchboard, wherein said lifting apparatus comprises in combination:
    a carriage upon which said electrical device is mounted;
    a plurality of rollers operatively associated with said carriage;
    guide rails directly mounted on the electrical switchboard and supporting said carriage for movement relative to the electrical switchboard such that said rollers move along said guide rails;
    means for pivotably mounting at least one pair of said plurality of rollers on each side of said carriage for cooperation with said guide rails so that the carriage may be readily removed from said guide rails to traverse across a floor surface; and
    means for moving said carriage connected to said carriage wherein said means for moving said carriage comprises:
    pinion means mounted on said carriage;
    a motor mounted on said carriage; and,
    a reduction gear mounted on said carriage, wherein said guide rails comprise at least one rack member which is engaged with said pinion means.

5. A lifting apparatus for racking an electrical device into and out of a compartment and an electrical switchboard, wherein said lifting apparatus comprises in combination:
    a carriage upon which said electrical device is mounted;
    a plurality of rollers operatively associated with said carriage;
    guide rails direclty mounted on the electrical switchboard and supporting said carriage for movement relative to the electrical switchboard such that said rollers move along said guide rails;
    means for moving said carriage connected to said carriage;
    a plurality of wheels mounted on said carriage for transport of said carriage to and from said electrical switchboard, and
    means for pivotably mounting at least one pair of said plurality of rollers on each side of said carriage for cooperation with said guide rails so that the carriage may be readily removed from said guide rails to traverse across a floor surface.

6. The lifting apparatus defined in claims 1 or 4 or 2 or 5, further comprising:
    a mounting plate pivotally mounted to said carriage for removal of said electrical device.

* * * * *